J. C. YARWOOD.
MACHINE FOR MOLDING BLOCKS.
APPLICATION FILED MAY 1, 1908.

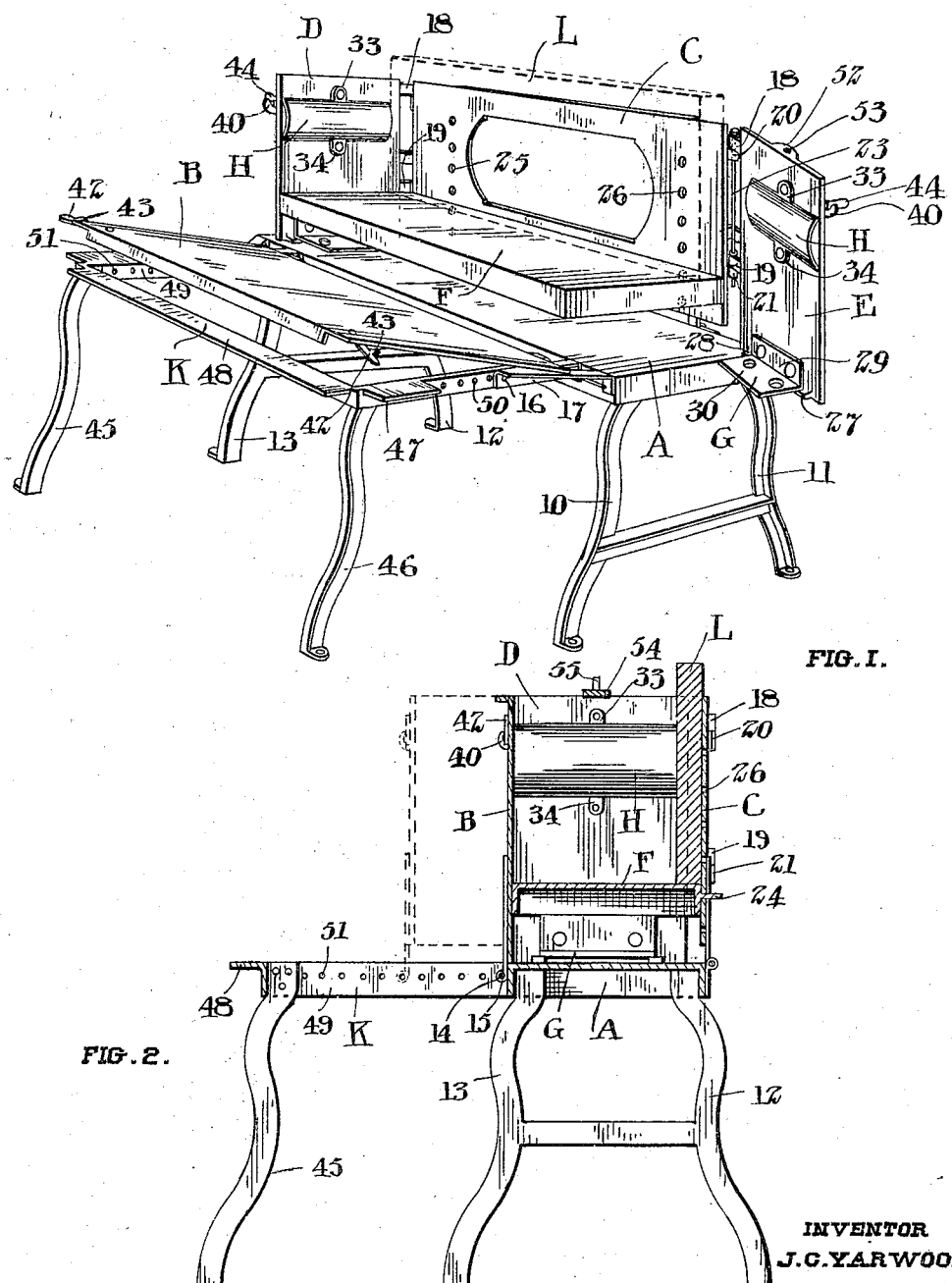

965,978.

Patented Aug. 2, 1910.
2 SHEETS—SHEET 2.

WITNESSES

INVENTOR
J.C. YARWOOD

BY

ATT'Y.

UNITED STATES PATENT OFFICE.

JOHN CROSS YARWOOD, OF BROCKVILLE, ONTARIO, CANADA.

MACHINE FOR MOLDING BLOCKS.

965,978.  Specification of Letters Patent.  Patented Aug. 2, 1910.

Application filed May 1, 1908. Serial No. 430,302.

*To all whom it may concern:*

Be it known that I, JOHN CROSS YARWOOD, of the town of Brockville, in the county of Leeds, Province of Ontario, Canada, have invented certain new and useful Improvements in Machines for Molding Blocks, of which the following is a specification.

My invention relates to improvements in cement block machines, and particularly to those of the type in which the sides of the blocks are molded by movable plates between which the cement is tamped, and its objects are to enable greater adjustment to be made in the machine, whereby a larger number of different sized blocks may be molded with the same pallets and side plates, to enable the machine to mold either with the face of the block downward or sidewise, whereby the larger blocks may be molded without tilting, and generally, to simplify the construction of the machine, whereby it will operate more efficiently and possess greater utility.

To enable the depth of the block molded to be adjusted, the face plate is adjustably supported from one of the side plates, the end plates being hinged to this side plate and having adjustable means for supporting the underside of the face plate and also having removable side cores for the block which are made in different sizes to correspond with the different sized blocks, the said cores being preferably bolted to the end plates and the bolt holes in which being so arranged that the cores will be accurately centered in position for the different sized blocks.

To shorten the length of the block the end plates may be replaced by auxiliary end plates so hinged that they will extend farther inwardly than the regular end plates and if desirable, further auxiliary shortening plates may be bolted or otherwise secured on the inside of the end plates.

To enable the larger sized blocks to be molded with their faces sidewise, the back plate on the machine with freedom of outward adjustment, as by brackets having means at different parts thereon, for pivoting the said back plate and to enable this adjustment to be carried to a greater extent an extension table is provided having means thereon for pivoting the back plate, whereby the same may be moved out farther, the details of these constructions and other features of the invention being more fully set forth and described in the accompanying specification and drawings.

Figure 3:
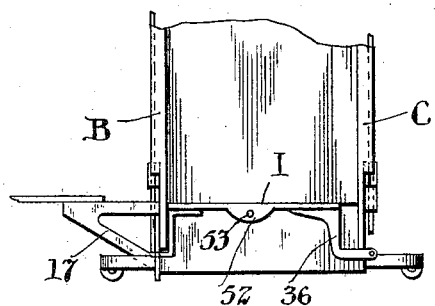
Figure 4:
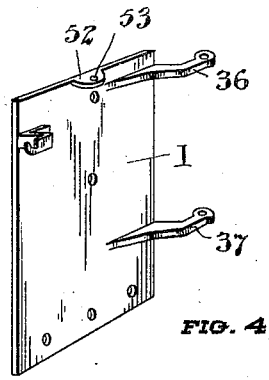
Figure 5:
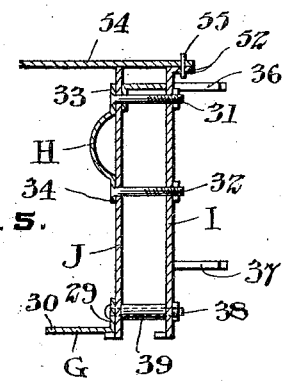
Figure 6:
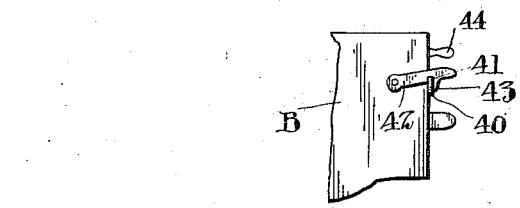
Figure 7:
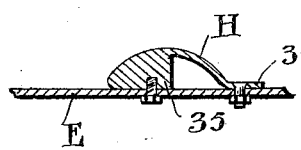
Figure 8:
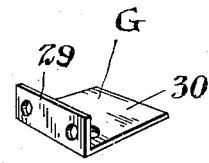

In the drawings, Figure 1 is a perspective view of the machine partially open. Fig. 2 is a transverse sectional view through the machine in closed position. Fig. 3 is a top view showing the auxiliary end plate in position. Fig. 4 is a perspective view of one of the auxiliary end plates. Fig. 5 is a vertical section through one of the end plates showing the shortening plate attached thereto. Fig. 6 is a detail elevation view of the lock for holding the side plates and end plates together. Fig. 7 is a sectional view showing one of the larger forms of side cores. Fig. 8 is a perspective view of the abutment plate provided on the end plate.

In the drawings, like figures of reference indicate corresponding parts in each figure.

Referring to the drawings, A represents the molding table of any suitable construction and 10, 11, 12 and 13 the legs thereof. To the top of this table the side plates B and C are hinged, the hinge for the plate B comprising a rod 14 extending through projecting lugs 15 in the side plate and being journaled in one pair of a series of holes 16 provided in brackets 17 supported from the table A near each end of the side plate. By this means the plate B, which will be hereinafter referred to as the back plate, can be moved outwardly from the table, for the purpose of enlarging the block to be molded, in this direction.

To the side plate C, the end plates D and E are hinged, the hinges being of the usual form and, as shown, comprising projections 18 and 19 on the end plates which fit above projections 20 and 21 on the side plates and a pivoting rod 23 extending through all the projections.

F represents the face plate which shall have any desired surface to suit the block being molded, that shown being plain, and in accordance with the present invention this face plate is adjustably supported by the side plate C, this being accomplished through the medium of pins 24 formed integral with the side or the face plate and being adapted to engage one pair of two series of perforations 25 and 26 in the side plates, whereby the face plate may be supported at any desired height on the side plate.

Means are provided on the end plate for supporting the underside of the face plate, and these means must, of necessity, be adjustable, to give support in the different positions. In its lowest position, the face plate is supported by projecting lugs 27 and 28 on the end plate and in its next highest, it is necessary to insert an abutment plate G, which is constructed L-shaped in cross-section, having a short side 29 and a long side 30. This plate is secured in position by means of bolts extending through bolt holes in the sides thereof and through the end plates. It will be seen that when this abutment plate is clamped, as shown in Fig. 1, with the short side against the end plate, the upper edge of the other side is adapted to support the underside of the face plate.

To give support in the next highest position, the abutment plate would be removed and turned in position until the long side 30 was against the end plate when the top edge of the long side would afford support to the face plate. In general, these three adjustments will be sufficient in the machine, but it is evident that if desired, others may be made by the use of different sizes of abutment plates.

In molding blocks of the character for which this machine is used, it is customary to form recesses in the ends of the same for economizing the material, and other purposes. To do this it is necessary to have cores on the end plates and these cores must vary with the different sizes of blocks.

According to the present invention, the core blocks H are supported from the end plate through the medium of bolts 31 and 32 extending through projections 33 and 34 in the core block and through holes in the end plates. The core blocks are formed in a number of different sizes and the projections with bolt holes therein for each different size, are so arranged that the same bolt holes in the end plates may be utilized, and thus the core blocks may be accurately centered for each size of block to be molded. Thus in Fig. 7 a larger size of core block is shown and in this form one of the projections 35 is formed on the underside of the core block, the other projection 33 being the same as shown in Fig. 1.

The length of the block may be shortened by replacing the end plates with others I, or by attaching a shortening plate on the inner side of the end plate or by a combination of both of these methods, and the auxiliary end plate which may be used to replace the ordinary end plate, in order to shorten the block, as shown in Figs. 3 and 4. In this form, the pivoting lugs 36 and 37 of the plate I are L-shaped in form and adapted to support the end plate a determined distance inwardly from the edge of the side plates.

The auxiliary shortening plate is illustrated in Fig. 5, and it is here shown used in combination with the auxiliary plate I, but it is evident that it can be used with the ordinary end plates D and E. It simply consists of a plate J supported on the inside of the end plate by means of bolts 38 which extend through separating blocks 39.

A suitable clamp is provided to hold the end plates and the back plate together, during the filling and tamping of the material, the particular form of catch I have designed consisting of a short bracket 40 secured to one member having a hook-shaped projection 41 on one end which acts in combination with a pivoted dog 42 having a correspondingly hooked projection 43 which interlocks, as shown in Fig. 6. For convenience in operating the different plates, suitable handles 44 may be provided on the end plates.

In order to permit even greater outward adjustment of the back plates than would be permitted by the brackets 17, an extension table K is provided, which is formed with lugs 45 and 46 and top members 47, 48 and 49, the members 47 and 49 having a series of perforations 50 and 51 therein, through which the pivoting rod 14 of the back plate is adapted to extend.

The inner perforations on the series are adapted to register with the perforations on the bracket 17 and the extension table will be retained in position by suitable bolts extending through the registering perforations.

For greater convenience in preventing separation of the end plates until the core has been withdrawn from the block, if such is used, projecting lugs 52 are provided on the top of the end plates having apertures 53 therein, the plates being retained together by means of a transversely extending bar 54 having apertures adapted to register with the apertures 53 through which dowel pins 55 extend.

In operating the machine when a block is to be molded face downward, the face plate is first placed in the downward position and the pallet board L is placed on the side plate C. The plate C is then swung to vertical position, the end plates swung inward and the back plate B raised and the clamps locked. The cement is then filled in the interior of the mold and suitably tamped, the core blocks being used on the end plates if it is desirable. As soon as tamping is completed the clamps are released and the plate C swung downwardly in horizontal position, the end plates swung outwardly and the pallet with the molded block therein is then removed.

If an interior core has been used, in the formation of the blocks, it will be desirable to place the bar 54 in position before swinging the side plate C to horizontal position, as then the core can be withdrawn before the end plates are released, preventing cracking or injuring of the block by the drawing of the core.

When it is desired to mold a block with the face sidewise, the back plate B will be moved outwardly on to the extension table, as shown in dotted lines in Fig. 2, and the end plates D and E will be replaced by larger plates. The pallet will be placed on the table and the face plate will be placed against the back plate. The molding operation will then be carried on as usual and when the plates are released the pallet with block thereon may be removed, it not being necessary in this case, to tilt the block after the molding operation is completed.

It will be seen that I have devised an exceedingly simple and effective machine for accomplishing the objects I desire to attain.

As many changes could be made in the above construction and many apparently widely different embodiments of my invention could be made without departing from the spirit or scope thereof, it is intended that all matter contained in these specifications and drawings shall be interpreted as illustrative and not in a limiting sense; it is also to be understood that the language of the following claims is intended to cover such generic and specific features of the invention herein described which, as a matter of language, might be said to be included thereby.

What I claim as my invention is:—

1. In a molding machine for blocks, the combination with the side plates and end plates adapted to extend vertically when closed, and means for hinging the side plates, of a face plate adapted to extend horizontally when the mold is closed, means for supporting the face plate from the side and end plates in a plurality of adjusted positions, and a plurality of L-shaped abutment plates on the end plates adapted to support the underside of the face plates.

2. In machine for molding blocks, the combination with the side plates and end plates, of a face plate, means for supporting the same in a number of different positions from one of the side plates, and abutment plates adjustably supported from the end plates, and having edges adapted, when the said abutment plate is adjusted, to support the face plate at different heights.

3. In a machine for molding blocks, the combination with the table having brackets at the side thereof, with perforations therethrough, of a removable extension table having top members with series of perforations therein, the outermost of said perforations being adapted to register with the perforations in the brackets, attaching means extending between the brackets and the extension table, a side plate and a pivoting rod for the same adapted to extend through the perforations either in the bracket or in the extension table.

In witness whereof I have hereunto set my hand in the presence of two witnesses.

JOHN CROSS YARWOOD.

Witnesses:
CHARLES C. BROUSE,
ALFRED COUNTRYMAN.